United States Patent
Song

(10) Patent No.: US 12,269,573 B2
(45) Date of Patent: Apr. 8, 2025

(54) CRASH LOAD DISTRIBUTION STRUCTURE OF FUSELAGE

(71) Applicants: Hyundai Motor Company, Seoul (KR); Kia Corporation, Seoul (KR)

(72) Inventor: Won Ki Song, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/221,289

(22) Filed: Jul. 12, 2023

(65) Prior Publication Data
US 2024/0308638 A1    Sep. 19, 2024

(30) Foreign Application Priority Data
Mar. 15, 2023 (KR) .......................... 10-2023-0033991

(51) Int. Cl.
    *B64C 1/06* (2006.01)
(52) U.S. Cl.
    CPC .................................. *B64C 1/062* (2013.01)
(58) Field of Classification Search
    CPC ... B64C 1/062; B64C 25/02; B64C 2025/325; B64C 25/52
    See application file for complete search history.

(56) References Cited

U.S. PATENT DOCUMENTS

| | | | | |
|---|---|---|---|---|
| 3,716,208 A | * | 2/1973 | Fagan | B64C 25/52 244/108 |
| 4,544,116 A | * | 10/1985 | Shwayder | B64C 25/52 244/108 |
| 5,109,580 A | * | 5/1992 | Camus | B64C 25/52 269/238 |
| 5,893,532 A | * | 4/1999 | Bain | B64C 25/52 244/17.11 |
| 9,926,074 B2 | | 3/2018 | Cranga | |
| 9,994,308 B2 | | 6/2018 | Bernier et al. | |
| 11,299,262 B2 | | 4/2022 | Carr et al. | |
| 2012/0043420 A1 | | 2/2012 | Prud'Homme-Lacroix | |
| 2015/0136906 A1 | * | 5/2015 | Fink | B64C 1/18 244/119 |
| 2016/0244155 A1 | | 8/2016 | Amante | |
| 2016/0280362 A1 | | 9/2016 | Prud'Homme-Lacroix | |

FOREIGN PATENT DOCUMENTS

KR    10-2153029 B    9/2020

* cited by examiner

*Primary Examiner* — Philip J Bonzell
*Assistant Examiner* — Eric Acosta
(74) *Attorney, Agent, or Firm* — Morgan, Lewis & Bockius LLP

(57) ABSTRACT

A crash load distribution structure of a fuselage, includes a floor frame defining a fuselage floor, a skid member fastened to the lower portion of the floor frame, and a crash box coupled to the skid member and extending to the lower portion of the floor frame, and configured to selectively deform in a crash load direction when an oblique crash occurs thereto.

16 Claims, 14 Drawing Sheets

CRASH LOAD DISTRIBUTION STRUCTURE OF FUSELAGE

CROSS-REFERENCE TO RELATED APPLICATION

The present application claims priority to Korean Patent Application No. 10-2023-0033991, filed on Mar. 15, 2023, the entire contents of which is incorporated herein for all purposes by this reference.

BACKGROUND OF THE PRESENT DISCLOSURE

Field of the Present Disclosure

The present disclosure relates to a crash load distribution structure of a fuselage. More particularly, it relates to a crash load distribution structure of a fuselage in which a crash box is provided at the front and rear of an air mobility vehicle, absorbing a crash load in the event of an oblique crash and transmitting a reduced crash load to the fuselage.

Description of Related Art

Recently, as an air traffic system to solve traffic congestion on the road, an urban air mobility (UAM) vehicle, which is an airborne means of transportation which may be used in a complex city center, is being developed. Such a UAM vehicle is a means of transportation capable of safely transporting passengers to a designated place in the city center or a short distance, and may be used at low cost because it is capable of vertical take-off and landing and thus does not need a separate runway.

Because passengers are located close to the internal side of the fuselage of such a UAM vehicle, technology to secure stability in the event of crash is of the highest importance. However, a conventional UAM vehicle has a problem in that safety is not guaranteed because a large crash load is transmitted to a space where passengers are located due to an impact applied to the fuselage during a crash.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a crash load distribution structure of a fuselage in which, for the fuselage that forms an air mobility vehicle, which is an airborne means of transportation, a front skid member is bolted to a fuselage-side bulkhead and support frame and a rear skid member is also fastened thereto in the same manner, while crash boxes are mounted on the front skid member and the rear skid member, respectively, so that when an oblique crash occurs, the crash boxes may be deformed to absorb collision energy generated by a crash load and a reduced crash load may be transmitted to the fuselage.

Various aspects of the present disclosure are directed to providing a structure including a floor frame defining a fuselage floor, a skid member fastened to a lower portion of the floor frame, and a crash box coupled to the skid member and extending to the lower portion of the floor frame, and configured to selectively deform in a crash load direction when an oblique crash occurs thereto.

In an exemplary embodiment of the present disclosure, the skid member may include a front skid member disposed in the front of the floor frame and fastened to the floor frame through insertion of a fastening member, and a rear skid member disposed in the rear of the floor frame and fastened to the floor frame through insertion of a fastening member.

In another exemplary embodiment of the present disclosure, the skid member may have integrated therein a pair of pipe nuts, into which the fastening member is inserted, the pair of pipe nuts extending in the longitudinal direction of the skid member.

In yet another exemplary embodiment of the present disclosure, the front skid member may be fastened to the lower portion of the floor frame so that the fastening member passes through a front bulkhead, positioned at a front side of the floor frame, and a connection frame member, supporting the floor frame, and is inserted into the pipe nut.

In yet another exemplary embodiment of the present disclosure, the rear skid member may be fastened to the lower portion of the floor frame so that the fastening member passes through a first rear frame located at a rear side of the floor frame and a second rear frame dividing a boarding area in the fuselage, and is inserted into the pipe nut.

In still yet another exemplary embodiment of the present disclosure, the crash box may include a front crash box coupled to the lower portion of the front skid member and configured to deform in a horizontal direction, and a rear crash box coupled to a lower portion of the rear skid member and configured to deform in a vertical direction.

In a further exemplary embodiment of the present disclosure, the front crash box may include an external member coupled to a connection member mounted on the front skid member, an internal member having a shape identical to the external member and coupled to an internal side of the external member, and a support member configured to shield an open internal area in the internal member.

In another further exemplary embodiment of the present disclosure, the external member may be provided with a plurality of beads extending in a vertical direction thereof and spaced apart at regular intervals, together with the internal member.

In yet another further exemplary embodiment of the present disclosure, the rear crash box may be provided with a plurality of beads extending in a horizontal direction thereof and spaced apart at regular intervals.

Various aspects of the present disclosure are directed to providing a structure including a floor frame defining a fuselage floor, a front skid member fastened to a front lower portion of the floor frame, a rear skid member fastened to a rear lower portion of the floor frame, and a crash box coupled to the front skid member and to the rear skid member and extending to the front and rear lower portions of the floor frame, and configured to selectively deform in a crash load direction when an oblique crash occurs thereto. Here, the front skid member and the rear skid member each may be provided therein with a pair of pipe nuts extending in a longitudinal direction thereof and allow a fastening member to be inserted into the pipe nut to be fastened to the floor frame, and when an oblique crash occurs, the crash box may be deformed and reaction force may be transmitted thereto.

In an exemplary embodiment of the present disclosure, the front skid member and the rear skid member each may be provided therein with a pair of pipe nuts spaced from each other.

In another exemplary embodiment of the present disclosure, the crash box may include a front crash box coupled to the lower portion of the front skid member, provided thereon with a plurality of beads extending in a vertical direction thereof and spaced apart at regular intervals, and configured to deform in a horizontal direction, and a rear crash box coupled to the lower portion of the rear skid member, provided thereon with a plurality of beads extending in a horizontal direction thereof and spaced apart at regular intervals, and configured to deform in a vertical direction thereof.

Other aspects and exemplary embodiments of the present disclosure are discussed infra.

It is to be understood that the term "vehicle" or "vehicular" or other similar terms as used herein are inclusive of motor vehicles in general, such as passenger automobiles including sports utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
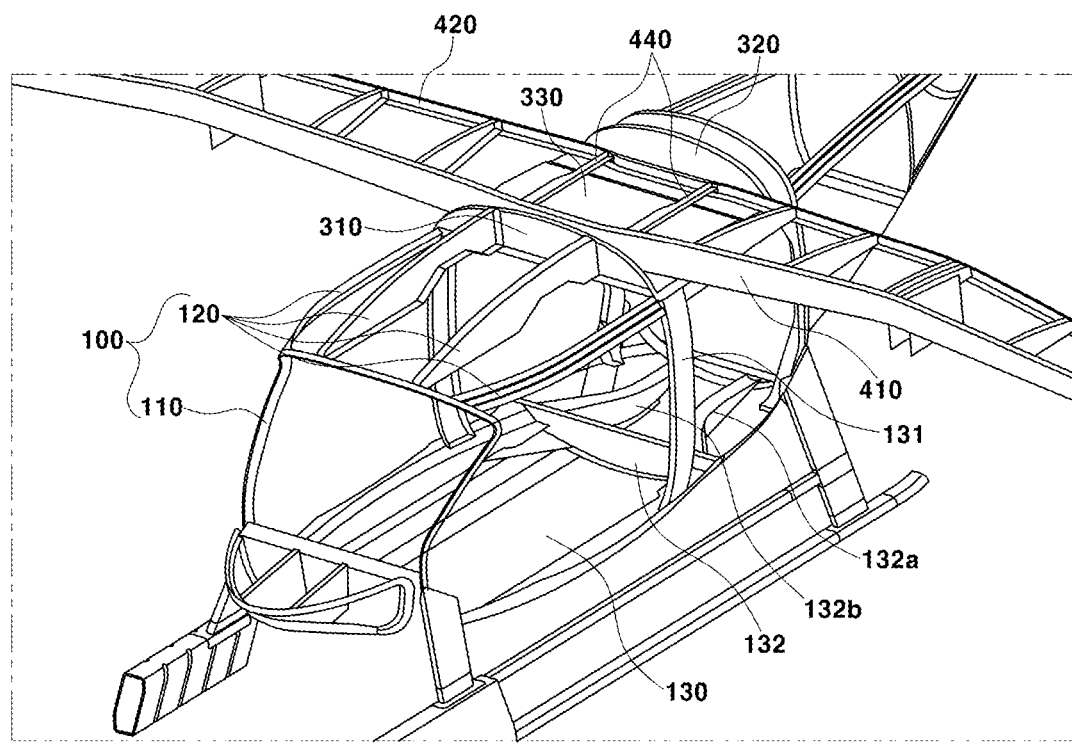
FIG. 1 is a view exemplarily illustrating a crash load distribution structure of a fuselage according to various exemplary embodiments of the present disclosure.

It should be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes, will be determined in part by the particular intended application and usage environment.

In the figures, the reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Description will now be provided in detail according to exemplary embodiments disclosed herein, with reference to the accompanying drawings.

Advantages and features of the present disclosure, and a method of achieving the same, will be apparent with reference to the exemplary embodiments described below in detail However, the present disclosure may be embodied in various forms, and should not be construed as being limited to the exemplary embodiments set forth herein. Rather, the exemplary embodiments are provided so that the present disclosure will be thorough and complete, and will fully convey the scope of the present disclosure to those skilled in the art. The present disclosure is defined only by the categories of the claims.

In describing the present disclosure, if a detailed explanation of a related known function or construction is considered to unnecessarily obscure the gist of the present disclosure, such explanation has been omitted but would be understood by those skilled in the art.

Figure 2:
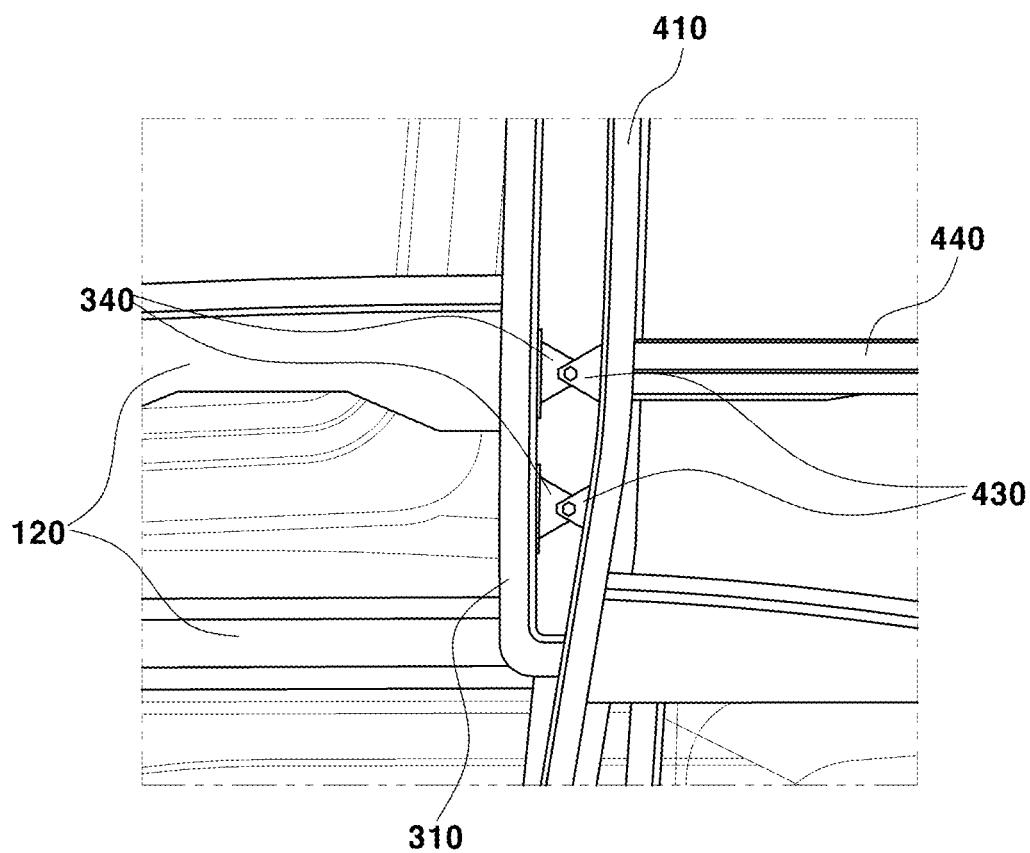
FIG. 2 is a view exemplarily illustrating a fastening relationship between a support fitting member and a wing fitting member in a crash load distribution structure of a fuselage according to various exemplary embodiments of the present disclosure.

FIG. 1 is a view exemplarily illustrating a crash load distribution structure of a fuselage according to various exemplary embodiments of the present disclosure, and FIG. 2 is a view exemplarily illustrating a fastening relationship between a support fitting member and a wing fitting member in a crash load distribution structure of a fuselage according to various exemplary embodiments of the present disclosure.

Referring to FIG. 1 and FIG. 2, the crash load distribution structure of the fuselage according to various exemplary embodiments of the present disclosure may include a support unit 300, positioned between a front unit 100 and a rear unit 200 and being connected to a wing unit 400, to allow a load applied to the fuselage to be distributed to the wing unit 400 and to the rear of the fuselage. According to various exemplary embodiments of the present disclosure, a longitudinal load and a vertical load applied to the fuselage may be transmitted through a connection structure between the front unit 100 and the support unit 300, a connection structure between the support unit 300 and the rear unit 200, and a connection structure between the support unit 300 and the wing unit 400, reducing a crash load entering a space where passengers are located.

The front unit 100 may be located in the front of the fuselage with respect to the wing. The front unit 100 may include a window frame 110 to which a windshield is mounted and a roof frame 120. The roof frame 120 may be connected to the rear end portion of the window frame 110 and extend in the longitudinal direction of the fuselage. The window frame 110 may be a frame surrounding the front windshield of the fuselage. The roof frame 120 may be fastened to the upper end portion of the window frame 110 and may be provided in plural by being spaced apart in the widthwise direction of the window frame 110. In an exemplary embodiment of the present disclosure, as illustrated in FIG. 1, a total of four roof frames 120, i.e., two at the center portion and two at the sides, may be space apart at regular intervals in the widthwise direction of the window frame 110. A floor frame 130 defines a fuselage floor 130a. The floor frame 130 may divide the indoor space inside the front unit 100 into a first-row passenger space in the front and a second-row passenger space in the rear. In an exemplary embodiment of the present disclosure, the floor frame 130 may be divided into the first-row passenger space and the second-row passenger space using a rear bulkhead 132 as a boundary. The rear bulkhead 132 may be provided with a pair of connection frames 132a and 132b to be connected to a second rear frame 220 to be described below.

The support unit 300 may be disposed between the front unit 100 and the rear unit 200. The roof frame 120 may be connected to the support unit 300. The roof frame 120 may include a rear end portion connected to the front end portion of the support unit 300. The support unit 300 may be connected to the front unit 100 and to the rear unit 200 so that a load applied to the front of the fuselage is distributed to the rear of the fuselage therethrough. The support unit 300 may include a first flange portion 310, a second flange portion 320, a plate portion 330, and a support fitting member 340.

The support unit 300 may include a structure in which the first flange portion 310 and the second flange portion 320 face each other with the plate portion 330 provided therebetween. The support unit 300 may have an internal side including a space where the first flange portion 310 and the second flange portion 320 face each other and are fastened. The first flange portion 310 may be connected to the rear end portion of the roof frame 120. The rear end portion of the roof frame 120 may be fastened to the front external surface of the first flange portion 310. The second flange portion 320 may be connected to the front end portion of the rear unit 200. The front end portion of the rear unit 200 may be fastened to the rear external surface of the second flange portion 320.

The plate portion 330 may be provided between the first flange portion 310 and the second flange portion 320. The plate portion 330 may define a back surface of a recessed area between the first flange portion 310 and the second flange portion 320 located at opposite sides in the longitudinal direction of the fuselage. The plate portion 330 may include a plate shape and may be provided between the lower end portions of the first flange portion 310 and the second flange portion 320. The plate portion 330 may be connected to a member that defines the external frame of the fuselage so that longitudinal and vertical loads in the fuselage are dispersed.

The support fitting member 340 may be provided on opposite sides on each of the internal surfaces of the first flange portion 310 and the second flange portion 320. In an exemplary embodiment of the present disclosure, the internal surface of the first flange portion 310 may be provided thereon with two support fitting members 340 at a left side and two support fitting members 340 at a right side in the widthwise direction thereof. Furthermore, the internal surface of the second flange portion 320 may be provided thereon with two support fitting members 340 at a left side and two support fitting members 340 at a right side in the widthwise direction thereof. The support fitting members 340 each may have one end portion provided at a position corresponding to the internal surface of the first flange portion 310 or to the internal surface of the second flange portion 320, and may have another end portion having formed therein a coupling portion to be fastened to a wing fitting member 430.

The wing unit 400 may be located inside the support unit 300. The wingunit 400 may be connected to the support unit 300 so that a load upon collision of the fuselage is distributed along the wing unit 400. The wing unit 400 may include a first skeleton portion 410, a second skeleton portion 420, the wing fitting member 430, a wing frame portion 440, and a skin portion 450. The first skeleton portion 410 may be spaced apart by a predetermined gap from the internal surface of the first flange portion 310 and extend in the widthwise direction of the fuselage. The second skeleton portion 420 may be spaced apart by a predetermined gap from the internal surface of the second flange portion 320 and extend in the widthwise direction of the fuselage. The first skeleton portion 410 may define a transverse skeleton of the front end portion of the wing unit 400, and the second skeleton portion 420 may define a transverse skeleton of the rear end portion of the wing unit 400.

The wing fitting member 430 may be provided on the external surface of the first skeleton portion 410 or on the external surface of the second skeleton portion 420 at a position corresponding to the longitudinal direction of the support fitting member 340. The external surface of the first skeleton portion 410 at which the wing fitting member 430 is located may be oriented so that the first skeleton portion 410 faces the first flange portion 310, and the external surface of the second skeleton portion 420 at which the wing fitting member 430 is located may be oriented so that the second skeleton portion 420 faces the second flange portion 320.

The wing fitting member 430 may be connected to the support fitting member 340. In an exemplary embodiment of the present disclosure, the external surface of the first skeleton portion 410 may be provided thereon with two wing fitting members 430 at a left side and two wing fitting members 430 at a right side in the widthwise direction thereof. Furthermore, the external surface of the second skeleton portion 420 may be provided thereon with two wing fitting members 430 at a left side and two wing fitting members 430 at a right side in the widthwise direction thereof. The wing fitting member 430 may have one end portion fixed to the external surface of the first skeleton portion 410 or to the external surface of the second skeleton portion 420, and may have another end portion having formed therein a coupling portion. The coupling portion of the support fitting member 340 and the coupling portion of the wing fitting member 430 may be mutually fastened, and the wing unit 400 may be fixed to the support unit 300.

The wing frame portion 440 may be provided between the first skeleton portion 410 and the second skeleton portion 420. The wing fitting member 430 is provided at a position corresponding to a longitudinal one end portion of the wing frame portion 440. As illustrated in FIG. 1, two wing frame portions 440 may be provided between the first frame portion 410 and the second frame portion 420 positioned above the plate portion 330. Furthermore, the wing frame portions 440 are positioned between the first skeleton portion 410 and the second skeleton portion 420 to allow loads applied to the first skeleton portion 410 and the second skeleton portion 420 to be transmitted to each other.

The skin portion 450 may surround the external sides of the first skeleton portion 410 and the second skeleton portion 420. The skin portion 450 may be brought into contact with the upper surfaces of the first skeleton portion 410 and the second skeleton portion 420. Accordingly, the skin portion 450 brought into contact with the first skeleton portion 410 and the second skeleton portion 420 may allow the load transmitted to the first skeleton portion 410 and to the second skeleton portion 420 to be distributed in the longitudinal direction or in the widthwise direction of the wing unit 400. The longitudinal load on the fuselage may pass through the front unit 100 and the support unit 300 and then be distributed to the wing unit 400.

Figure 3:
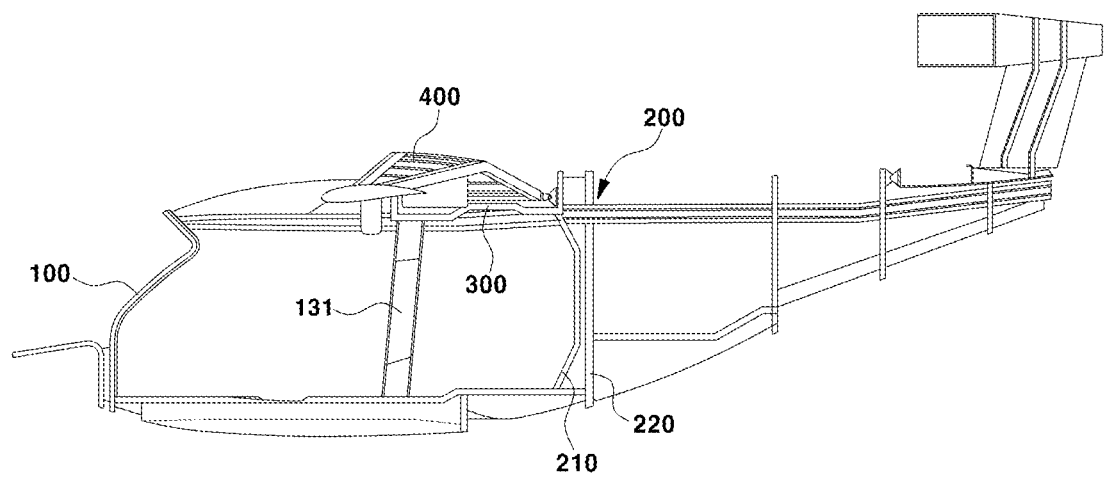
FIG. 3 is a view exemplarily illustrating a rear unit in a crash load distribution structure of a fuselage according to various exemplary embodiments of the present disclosure.
Figure 4:
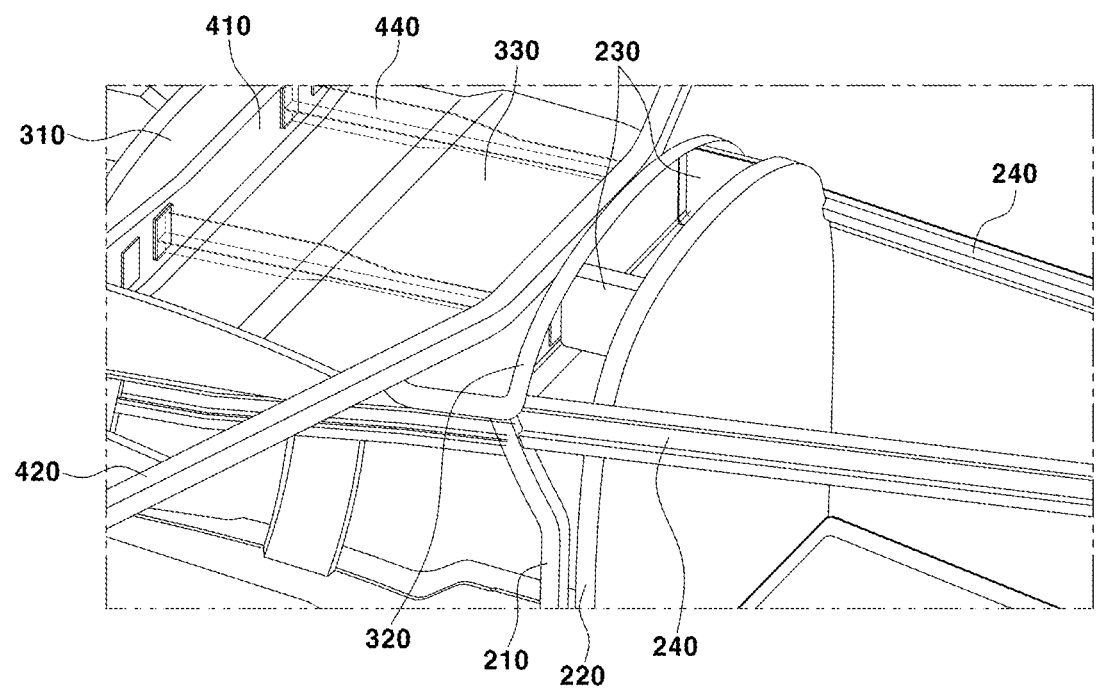
FIG. 4 is a view exemplarily illustrating a connection relationship between a wing unit and a rear unit in a crash load distribution structure of a fuselage according to various exemplary embodiments of the present disclosure.

FIG. 3 is a view exemplarily illustrating a rear unit in a crash load distribution structure of a fuselage according to various exemplary embodiments of the present disclosure, and FIG. 4 is a view exemplarily illustrating a connection relationship between a wing unit and a rear unit in a crash load distribution structure of a fuselage according to various exemplary embodiments of the present disclosure.

Referring to FIG. 3 and FIG. 4, the rear unit 200 may be located at the rear of the fuselage with respect to the wing. The rear unit 200 may include the first rear frame 210, the second rear frame 220, a rear center frame 230, and a rear side frame 240. The first rear frame 210 may be connected to the plate portion 330. The first rear frame 210 may extend in the height direction along the external side of the fuselage and be fastened to the lower end portion of the second flange portion 320 from the fuselage floor 130*a*. In an exemplary embodiment of the present disclosure, the first rear frame 210 may include an upper end portion being brought into contact with the lower end portion of the second flange portion 320.

The second rear frame 220 may be located at the rear of the first rear frame 210. The second rear frame 220 may include a plate shape and be located adjacent to the rear end portion of the first rear frame 210. The second rear frame 220 may be fastened to the pair of connection frames 132*a* and 132*b* connected to the rear bulkhead 132 and may be positioned to include a predetermined gap, more specifically, a gap corresponding to the length of the rear center frame 230 of FIG. 4, from the upper end portion of the first rear frame 210, and accordingly, a load coming from the lower end portion of the fuselage may be transmitted to the upper end portion of the fuselage in the height direction thereof.

The rear center frame 230 may be disposed between the second flange portion 320 and the second rear frame 220. The rear center frame 230 may be disposed in a space between the second flange portion 320 and the second rear frame 220 where the same face each other. In an exemplary embodiment of the present disclosure, the rear center frame 230 may be provided as two and may be provided at positions each longitudinally corresponding to the position of the wing frame portion 440.

The rear side frame 240 may be brought into contact with the first rear frame 210 and the second rear frame 220. The rear side frame 240 may be connected to the upper end portion of the first rear frame 210 and the upper end portion of the second rear frame 220. The rear side frame 240 may extend rearwards in the longitudinal direction of the fuselage. The rear side frame 240 may have one end portion connected to the first rear frame and may have another end portion extending to the rear of the fuselage.

Figure 5:
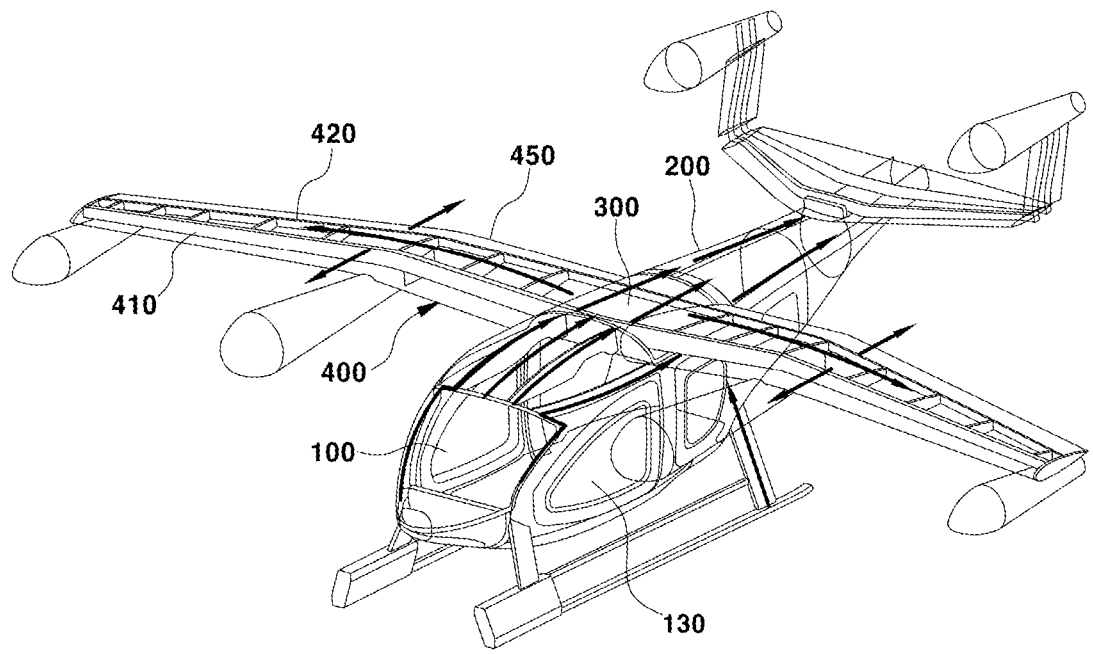
FIG. 5 is a view exemplarily illustrating that longitudinal and vertical loads are distributed to a wing unit and to a rear of a fuselage in a crash load distribution structure of the fuselage according to various exemplary embodiments of the present disclosure.

FIG. 5 is a view exemplarily illustrating that longitudinal and vertical loads are distributed to a wing unit and to a rear of a fuselage in a crash load distribution structure of the fuselage according to various exemplary embodiments of the present disclosure.

Referring to FIG. 5, a longitudinal load on the fuselage may be transmitted to the first flange portion 310 through the window frame 110 and the roof frame 120, and then be transmitted to the first skeleton portion 410 via the support fitting member 340 and the wing fitting member 430 and distributed through the skin portion 450. Furthermore, the load transmitted to the first skeleton portion 410 may be transmitted to the second skeleton portion 420 via the wing frame portion 440 and distributed through the skin portion 450.

In an exemplary embodiment of the present disclosure, when the fuselage falls and a crash load having a predetermined angle with the front end portion of the fuselage is applied, a longitudinal load may enter the window frame 110 and be transmitted to the front end portion of the roof frame 120 connected to the rear end portion of the window frame 110. Thereafter, the load transmitted to the rear end portion of the roof frame 120 may be transmitted to the first flange portion 310, and then be transmitted to the support fitting member 340 and to the wing fitting member 430. The load transmitted to the support fitting member 340 and to the wing fitting member 430 may be transmitted to the first skeleton portion 410 and be distributed in the longitudinal direction of the first skeleton portion 410. The load distributed in the longitudinal direction of the first skeleton portion 410 may also be distributed in the longitudinal direction of the fuselage through the skin portion 450. Furthermore, the load transmitted to the first skeleton portion 410 may be transmitted to the second skeleton portion 420 via the wing frame portion 440 and distributed in the longitudinal direction of the second skeleton portion 420. The load distributed in the longitudinal direction of the second skeleton portion 420 may also be distributed in the longitudinal direction of the fuselage through the skin portion 450.

Meanwhile, a vertical load on the fuselage may be transmitted to the second flange portion 320 via the first rear frame 210 and transmitted to the rear side frame 240 and the rear center frame 230 of the rear unit 200 via the second rear frame 220, and then be transmitted to the second skeleton portion 420 via the support fitting member 340 and the wing fitting member 430, then be distributed through the skin portion 450. Furthermore, the load transmitted to the second skeleton portion 420 may be transmitted to the first skeleton portion 410 via the wing frame portion 440 and distributed over the entire area of the fuselage.

In an exemplary embodiment of the present disclosure, when a crash load is applied in a vertical direction of the fuselage, the vertical load transmitted to the fuselage may enter the lower end portion of the first rear frame 210 and then be transmitted to the second flange portion 320 connected to the upper end portion of the first rear frame 210. Furthermore, a portion of the vertical load applied to the fuselage may enter the lower end portion of the second rear frame 220 and be transmitted to the rear side frame 240 connected to the upper end portion of the second rear frame 220. The crash load applied to the second rear frame 220 may be transmitted to the second flange portion 320, and be transmitted to the wing fitting member 430 via the support fitting member 340 fastened to the second flange portion 320. The load transmitted to the support fitting member 340 and to the wing fitting member 430 may be transmitted to the second skeleton portion 420 and be distributed in the longitudinal direction of the second skeleton portion 420. The load distributed in the longitudinal direction of the second skeleton portion 420 may also be distributed in the longitudinal direction of the fuselage through the skin portion 450. Furthermore, the load transmitted to the second skeleton portion 420 may be transmitted to the first skeleton portion 410 via the wing frame portion 440 and distributed in the longitudinal direction of the first skeleton portion 410. The load distributed in the longitudinal direction of the first skeleton portion 410 may also be distributed in the longitudinal direction of the fuselage through the skin portion 450. Accordingly, the vertical load on the fuselage may pass through the rear unit 200 and then be distributed to the wing unit 400 through the support unit 300.

Figure 6:
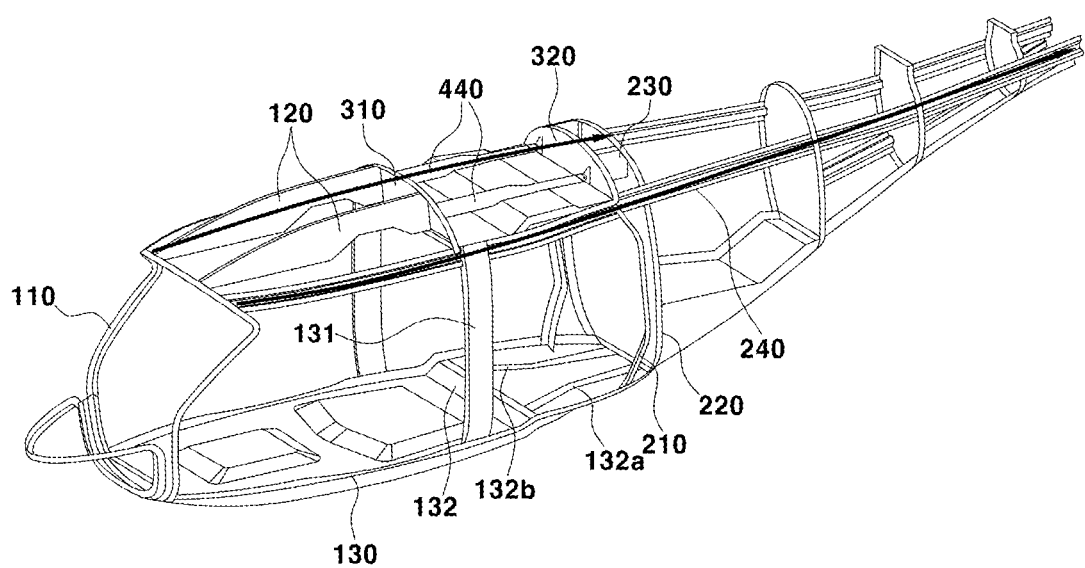
FIG. 6 is a view exemplarily illustrating transmission of a longitudinal load on a center portion and sides in a crash load distribution structure of a fuselage according to various exemplary embodiments of the present disclosure.

FIG. 6 is a view exemplarily illustrating transmission of a longitudinal load on a center portion and sides in a crash load distribution structure of a fuselage according to various exemplary embodiments of the present disclosure.

Referring to FIG. 6, a load applied in the longitudinal direction of the fuselage may be transmitted from the roof frame 120 to the wing frame portion 440 via the first flange portion 310 and transmitted from the wing frame portion 440 to the rear center frame 230 via the second flange portion 320. Furthermore, side loads in the longitudinal direction of the fuselage each may be transmitted from the front roof frame 120 at a corresponding one of opposite side end portions of the fuselage to the rear side frame 240 via the first rear frame 210 along the side surface of the plate portion 330.

A load applied in the longitudinal direction of the fuselage may be transmitted from the front end portion of the roof frame 120 to the rear end portion of the same, and then be transmitted to the support fitting member 340 and the wing fitting member 430 adjacent to the first flange portion 310 via the first flange portion 310. Thereafter, the load transmitted to the support fitting member 340 and the wing fitting member 430 adjacent to the first flange portion 310 may be transmitted to the wing frame portion 440, and then may be transmitted to the support fitting member 340 and the wing fitting member 430 adjacent to the second flange portion 320. The load transmitted to the support fitting member 340 and the wing fitting member 430 adjacent to the second flange portion 320 may be transmitted to the second flange portion 320, and then be transmitted to the rear center frame 230.

Furthermore, among the loads in the longitudinal direction of the fuselage, loads transmitted along the side surfaces may be transmitted from the front end portion to the rear end portion of the fuselage along the roof frames 120 at opposite side end portions, respectively, and may be transmitted to the rear of the fuselage in the longitudinal direction of the plate portion 330. The load transmitted to the rear end portion of the plate portion 330 may be transmitted to the rear side frame 240 via the first rear frame 210.

In summary, various aspects of the present disclosure are directed to providing a crash load distribution structure of a fuselage to which the support unit 300 is applied to allow a crash load entering the fuselage to be transmitted and distributed to the wing unit 400 and to the rear of the fuselage and the crash load entering a space where passengers are located to be reduced to thereby secure stability.

Figure 7:
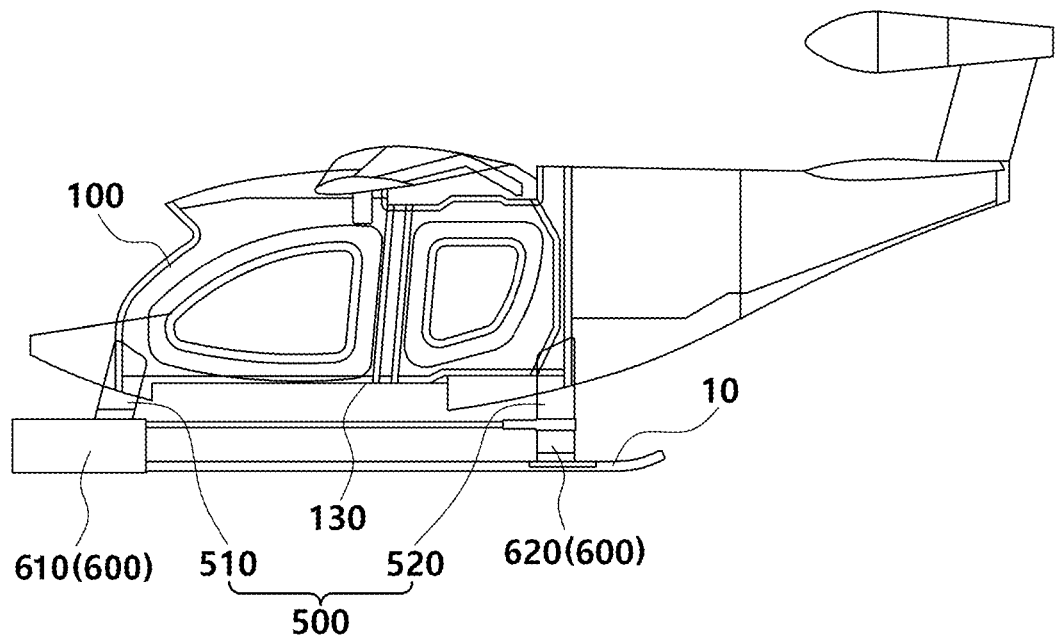
FIG. 7 is a view schematically illustrating a crash load distribution structure of a fuselage according to various exemplary embodiments of the present disclosure.
Figure 8:
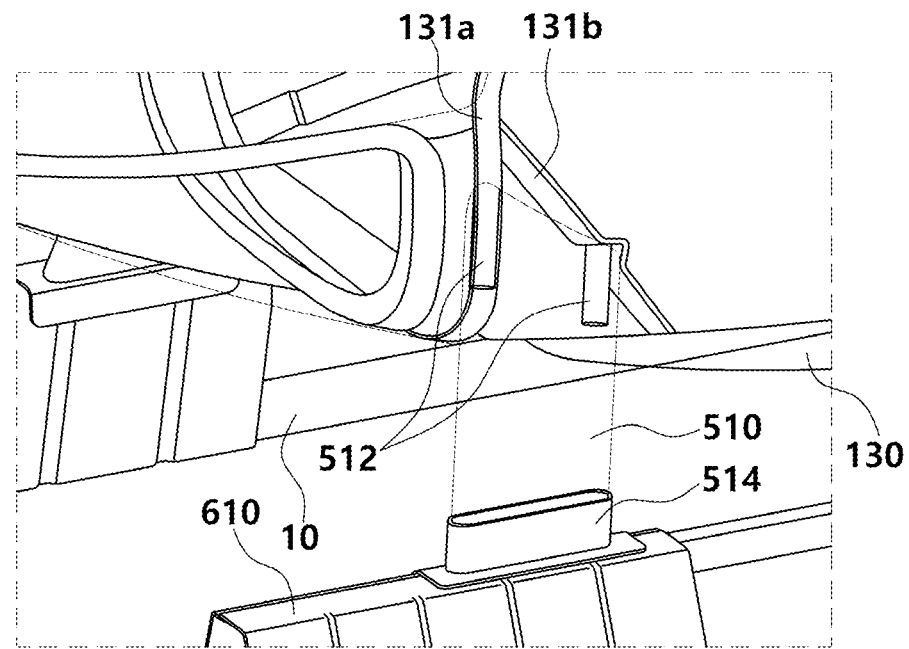
FIG. 8 is a view exemplarily illustrating a front skid member in a crash load distribution structure of a fuselage according to various exemplary embodiments of the present disclosure.

FIG. 7 is a view schematically illustrating a crash load distribution structure of a fuselage according to various exemplary embodiments of the present disclosure, and FIG. 8 is a view exemplarily illustrating a front skid member in a crash load distribution structure of a fuselage according to various exemplary embodiments of the present disclosure.

Figure 9:
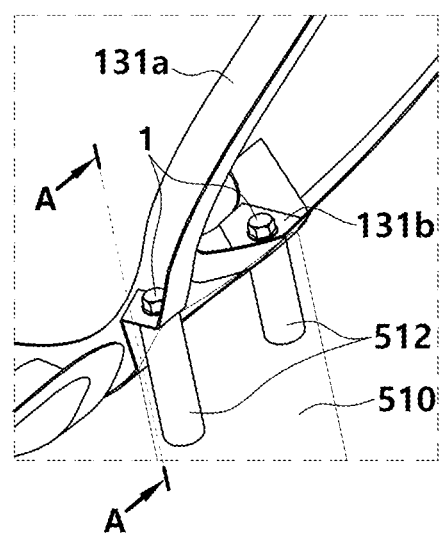
FIG. 9 is a view exemplarily illustrating a fastened state between a floor frame and a skid member in a crash load distribution structure of a fuselage according to various exemplary embodiments of the present disclosure.
Figure 10:
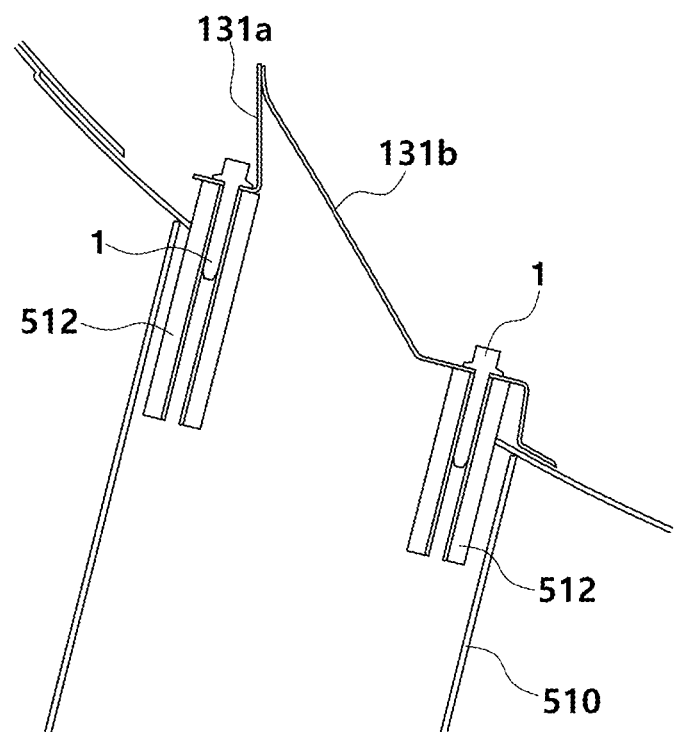
FIG. 10 is a view exemplarily illustrating a cross section A-A of FIG. 9 in a crash load distribution structure of a fuselage according to various exemplary embodiments of the present disclosure.

FIG. 9 is a view exemplarily illustrating a fastened state between a floor frame and a skid member in a crash load distribution structure of a fuselage according to various exemplary embodiments of the present disclosure, and FIG. 10 is a view exemplarily illustrating a cross section A-A of FIG. 9 in a crash load distribution structure of a fuselage according to various exemplary embodiments of the present disclosure.

Figure 11:
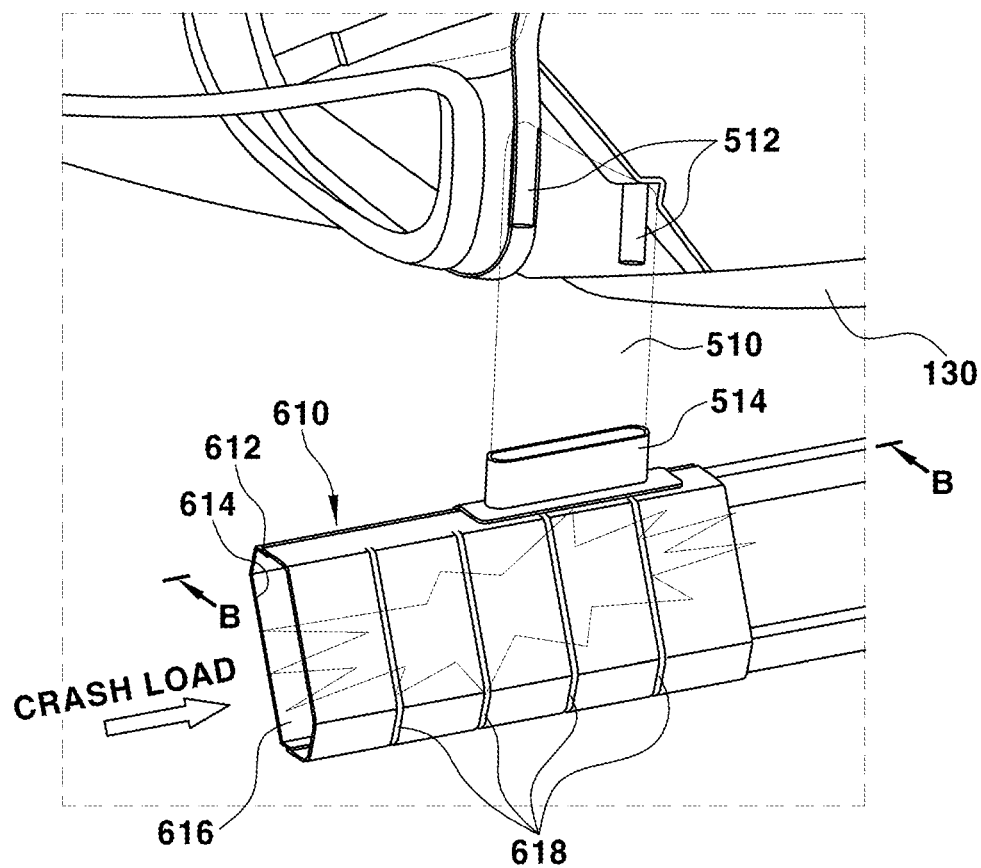
FIG. 11 is a view exemplarily illustrating a front crash box in a crash load distribution structure of a fuselage according to various exemplary embodiments of the present disclosure.
Figure 12:
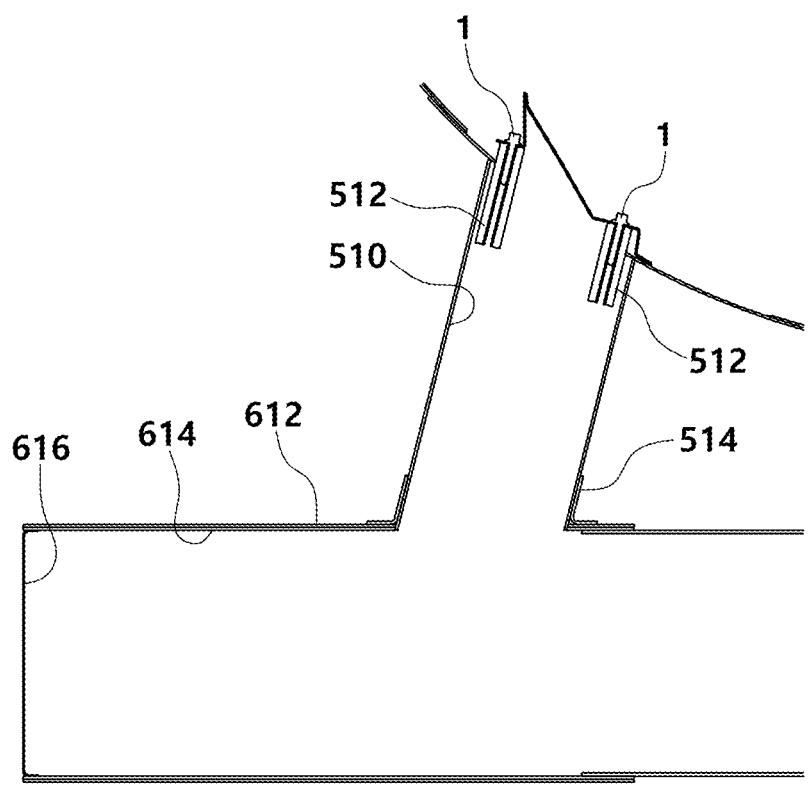
FIG. 12 is a view exemplarily illustrating a cross section B-B of FIG. 11 in a crash load distribution structure of a fuselage according to various exemplary embodiments of the present disclosure.

FIG. 11 is a view exemplarily illustrating a front crash box in a crash load distribution structure of a fuselage according to various exemplary embodiments of the present disclosure, and FIG. 12 is a view exemplarily illustrating a cross section B-B of FIG. 11 in a crash load distribution structure of a fuselage according to various exemplary embodiments of the present disclosure.

Figure 13:
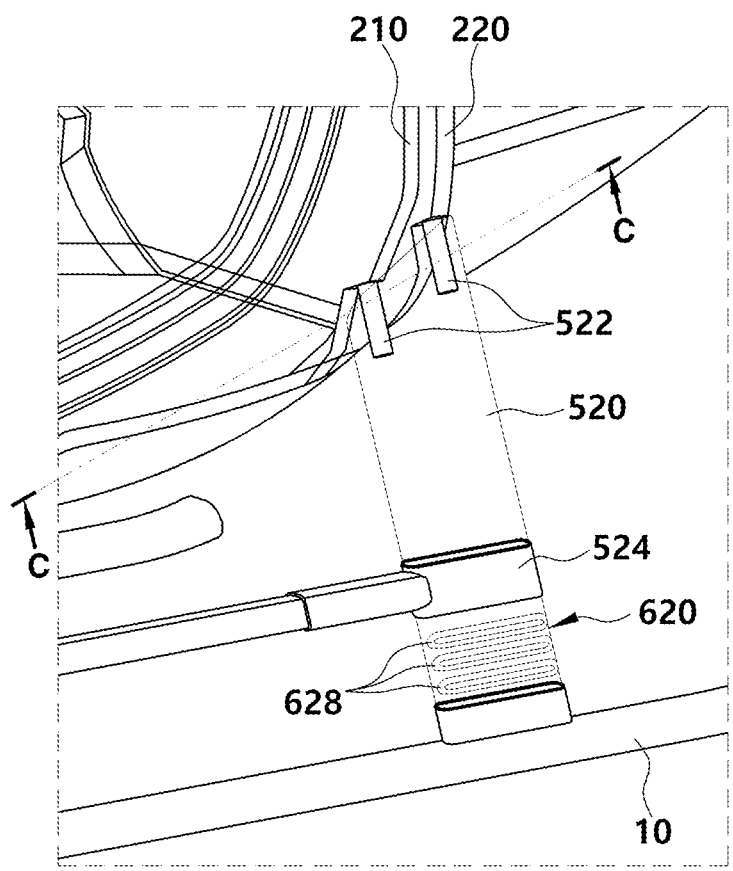
FIG. 13 is a view exemplarily illustrating a front crash box in a crash load distribution structure of a fuselage according to various exemplary embodiments of the present disclosure.
Figure 14:
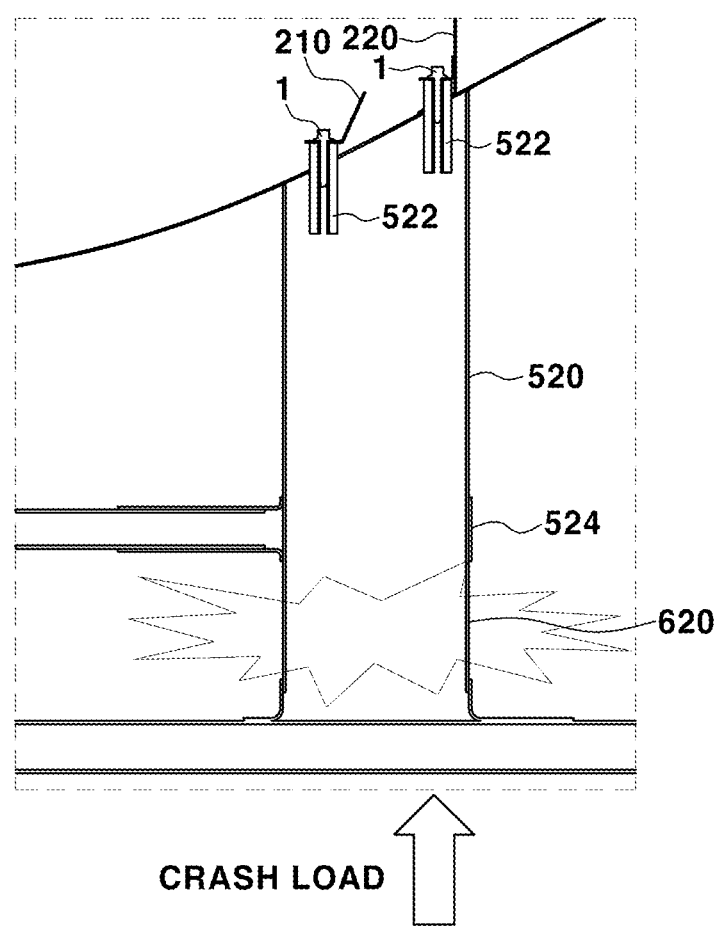
FIG. 14 is a view exemplarily illustrating a cross section C-C of FIG. 13 in a crash load distribution structure of a fuselage according to various exemplary embodiments of the present disclosure.

FIG. 13 is a view exemplarily illustrating a front crash box in a crash load distribution structure of a fuselage according to various exemplary embodiments of the present disclosure, and FIG. 14 is a view exemplarily illustrating a cross section C-C of FIG. 13 in a crash load distribution structure of a fuselage according to various exemplary embodiments of the present disclosure.

In a general aircraft fall mode, a crash load is generated in an oblique direction at the front of the fuselage, and after a collision with the front of the fuselage occurs, the rear of the fuselage collides with the ground, and a crash load is generated in a vertical direction thereof and transmitted to the fuselage.

The air mobility vehicle according to the present exemplary embodiment includes an aircraft configured for vertical take-off and landing as well as mid-range flight, and may be defined as an advanced air mobility (AAM) vehicle including both manned/unmanned aircraft and autonomous flying or human-driven aircraft. Even in the case of such an air mobility vehicle, because the fuselage includes a structure similar to that of the above-described conventional aircraft, a crash load is generated in the same direction in a fall mode or a vertical take-off and landing mode using a runway. For the present reason, it is important to absorb impact energy at the front and rear of the fuselage, reducing deformation of a boarding area.

To the present end, the crash load distribution structure of the fuselage according to the present exemplary embodiment includes the floor frame 130, a skid member, and a crash box, as illustrated in FIG. 7.

The floor frame 130 defines the floor of the fuselage.

The skid member is fastened to the lower portion of the floor frame 130 to connect a skid 20 to the fuselage, and is extended to include a predetermined length.

The skid member may include a front skid member 510 and a rear skid member 520 depending on the location thereof.

The front skid member 510 may be disposed at a front of the floor frame 130, and as illustrated in FIG. 9, may be fastened to the fuselage through insertion of a fastening member 1.

In other words, the front skid member 510 is provided therein with a pair of pipe nuts 512, extending in the longitudinal direction of the front skid member 510, into which the fastening member 1 is inserted, and accordingly, in a state in which the front skid member 510 is positioned at a position to be fastened, fastening may be performed through insertion of the fastening member 1.

As illustrated in FIG. 8, FIG. 9 and FIG. 10, the front skid member 510 may be fastened to the lower portion of the floor frame 130 by the fastening members 1 passing through a front bulkhead 131a, positioned at the front of the floor frame 130, and a connection frame member 131b, supporting the floor frame 130, and being inserted into the pipe nuts 512, respectively.

In comparison, generally, the front skid member is coupled to the lower portion of the fuselage by positioning a separate mounting joint at the lower portion of the fuselage and fastening thereto a plurality of rivets. However, in such a structure, there occur problems in that the number of parts increases due to the plurality of rivets and mounting joints and fastening force decreases as the front skid member is indirectly fastened to the lower rim of the fuselage.

For the present reason, in the crash load distribution structure according to the exemplary embodiment of the present disclosure, the fastening members 1 are inserted into fastening holes formed in the front bulkhead 131a at the front side of the floor frame 130 and in the connection frame member 131b supporting the floor frame 130, respectively, and the fastening members 1 are each fastened to a corresponding one of the pair of pipe nuts 512 provided in the front skid member 510, eliminating rivets and mounting joints to reduce the number of parts compared to the related art structure.

Furthermore, in the crash load distribution structure according to the exemplary embodiment of the present disclosure, because the front skid member 510 is directly fastened to the floor frame 130, fastening force may be improved compared to the related art structure.

Moreover, the pair of pipe nuts 512 extends to include a predetermined length and is integrated with the front skid member 510 by being coupled to the inside of the front skid member 510 through $CO_2$ welding or the like. With the present configuration, reaction force due to the crash load generated at the front of the skid 20 may be transmitted to a front crash box 610, and accordingly, the front crash box 610 may be deformed to absorb the collision energy.

The rear skid member 520 may be disposed at a rear of the floor frame 130 and be fastened through insertion of the fastening member 1, in the same manner as the front skid member 510 described above.

As illustrated in FIG. 14, the rear skid member 520 may be fastened to the lower portion of the floor frame 130 so that the fastening members 1 pass through the first rear frame 210, extending to the rear of the floor frame 130, and the second rear frame 220, dividing the boarding area in the fuselage, and then are inserted into pipe nuts 522, respectively.

Because the rear skid member 520 is fastened to the lower portion of the floor frame 130 in the same way as the front skid member 510, reaction force due to the crash load generated at the rear side of the skid 20 may be transmitted from the fastened position to a rear crash box 520, and accordingly, the rear crash box 520 may be deformed to absorb the collision energy.

Meanwhile, the crash box may be coupled to the skid member, i.e., the front skid member 510 and the rear skid member 520, respectively, and extend to the skid 20 (see FIG. 13), undergoing shape deformation due to a crash load when an oblique crash occurs thereto.

Here, the crash box may include the front crash box 610 coupled to the front skid member 510 and the rear crash box 620 coupled to the rear skid member 520, depending on the coupling position.

The front crash box 610 may be deformed in a horizontal direction when a crash load is generated.

The front crash box 610 may include a predetermined size and height to absorb collision energy. To the present end, the front crash box 610 may include an external member 612, an internal member 614, and a support member 616, as illustrated in FIG. 11 and FIG. 12.

The external member 612 defines the external side of the front crash box 610 and is coupled to a connection member 514, mounted on the front skid member 510, through welding or the like.

The internal member 614 defines the internal side of the front crash box 610. The internal member 614 includes the same shape as the external member 612 and is coupled to the internal side of the external member 612.

Furthermore, the support member 616 may shield the open internal area in the internal member 614 to achieve structural reinforcement of the front crash box 610.

The external member 612, the internal member 614, and the support member 616 may be coupled through welding or the like, and may be located at the forefront of the skid and deformed when a crash load is applied in the direction of the arrow in FIG. 11.

To the present end, the external member 612 may be provided with a plurality of beads 618 extending in a vertical direction thereof and spaced apart at regular intervals, together with the internal member 614. The beads 618 may allow the front crash box 610 to be deformed in the horizontal direction, more specifically, in the direction of the crash load applied when an oblique crash occurs thereto.

In other words, in a general fall mode, a crash load is generated in an oblique direction at the front of the fuselage.

When such a crash load is generated, reaction force by the front skid member 510 is transmitted to the front crash box 610 and the gap between the plurality of beads 618 decreases, and thus the front crash box 610 is deformed to absorb collision energy, minimizing transmission of the collision energy to the boarding area.

Similarly, the rear crash box 620 may be deformed in a vertical direction as a crash load is applied in the direction of the arrow in FIG. 14.

That is, because the rear crash box 620 is coupled to a connection member 524 coupled to the rear skid member 520 through welding or the like and is provided with a plurality of beads 628 extending in the horizontal direction and spaced apart at regular intervals, the rear crash box 620 may be deformed by the beads 628 in a vertical direction, more specifically, in a direction in which a crash load is applied.

In other words, in the above-mentioned general fall mode, after a crash at the front of the fuselage occurs, the rear of the fuselage collides with the ground, and a crash load is generated in the vertical direction and is transmitted to the fuselage (direction of arrow in FIG. 14).

When such a crash load is generated, reaction force by the rear skid member 520 is transmitted to the rear crash box 620 and the gap between the plurality of beads 628 decreases, and thus the rear crash box 620 is deformed to absorb collision energy, minimizing transmission of the collision energy to the boarding area not only at the front of the fuselage but also at the rear.

As is apparent from the above description, various aspects of the present disclosure are directed to providing the following effects.

According to an exemplary embodiment of the present disclosure, for a fuselage that forms an air mobility vehicle, which is an airborne means of transportation, a front skid member is bolted to a fuselage-side bulkhead and support frame and a rear skid member is also fastened thereto in the same manner, while crash boxes are mounted on the front skid member and the rear skid member, respectively, so that when an oblique crash occurs, the crash boxes may be deformed to absorb collision energy generated by a crash load and a reduced crash load may be transmitted to the fuselage.

Accordingly, the present disclosure includes an effect of mitigating the impact transmitted to the fuselage in an oblique crash situation.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A structure, comprising:
   a floor frame defining a fuselage floor;
   a skid member fastened to a lower portion of the floor frame; and
   a crash box coupled to the skid member and extending to the lower portion of the floor frame, and configured to selectively deform in a crash load direction when a crash occurs thereto,
   wherein the skid member includes a rear skid member disposed in a rear of the floor frame and fastened to the floor frame through insertion of a second fastening member, and
   wherein the rear skid member is fastened to the lower portion of the floor frame so that the second fastening member passes through a first rear frame located at a rear side of the floor frame and a second rear frame dividing a boarding area in a fuselage, and is inserted into at least a second pipe nut integrated in the rear skid member.

2. The structure of claim 1, wherein the skid member further includes:
   a front skid member disposed in a front of the floor frame and fastened to the floor frame through insertion of a first fastening member.

3. The structure of claim 2, wherein the crash box includes:
   a front crash box coupled to a lower portion of the front skid member and configured to deform in a horizontal direction thereof when the crash occurs.

4. The structure of claim 3, wherein the front crash box includes:
   an external member coupled to a connection member mounted on the front skid member;
   an internal member including a shape identical to the external member and coupled to an internal side of the external member; and
   a support member configured to shield an open internal area in the internal member.

5. The structure of claim 4, wherein the external member is provided with a plurality of beads extending in a vertical direction thereof and spaced apart at regular intervals, together with the internal member.

6. The structure of claim 2,
   wherein the front skid member further includes at least a first pipe nut integrated in the front skid member, and
   wherein the first fastening member is inserted into the at least a first pipe nut extending in a longitudinal direction of the front skid member.

7. The structure of claim 6, wherein the front skid member is fastened to the lower portion of the floor frame so that the first fastening member passes through a front bulkhead, positioned at a front side of the floor frame, and a connection frame member, supporting the floor frame, and is inserted into the at least a first pipe nut.

8. The structure of claim 1,
   wherein the second fastening member is inserted into the at least a second pipe nut extending in a longitudinal direction of the rear skid member.

9. The structure of claim 1, further including a rear center frame, wherein the first rear frame and the second rear frame extend in a height direction of the structure, the second rear frame is located at a rear of the first rear frame, and the rear center frame is disposed between the first rear frame and the second rear frame and extends in a longitudinal direction of the structure.

10. The structure of claim 1, wherein the crash box includes:
a rear crash box coupled to a lower portion of the rear skid member and configured to deform in a vertical direction thereof.

11. The structure of claim 10, wherein the rear crash box is provided with a plurality of beads extending in a horizontal direction thereof and spaced apart at regular intervals.

12. The structure of claim 1, further including a rear unit connected to the floor frame, wherein the rear unit includes a first rear frame, a second rear frame and a rear center frame, wherein the first rear frame and the second rear frame extend in a height direction of the structure, the second rear frame is located at a rear of the first rear frame, and the rear center frame is disposed between the first rear frame and the second rear frame and extends in a longitudinal direction of the structure.

13. A structure, comprising:
a floor frame defining a fuselage floor;
a front skid member fastened to a front lower portion of the floor frame;
a rear skid member fastened to a rear lower portion of the floor frame; and
a crash box coupled to the front skid member and to the rear skid member and extending to the front and rear lower portions of the floor frame, and configured to selectively deform in a crash load direction when a crash occurs thereto,
wherein the front skid member and the rear skid member are each provided therein with a pair of pipe nuts extending in a longitudinal direction thereof and allows a fastening member to be inserted into the pipe nuts to be fastened to the floor frame, and when a crash occurs thereto, the crash box is deformed and reaction force is transmitted thereto,
wherein the rear skid member is fastened to the rear lower portion of the floor frame so that the fastening member passes through a first rear frame located at a rear side of the floor frame and a second rear frame dividing a boarding area in a fuselage, and is inserted into the pipe nuts.

14. The structure of claim 13, wherein the front skid member and the rear skid member are each provided therein with the pair of pipe nuts spaced from each other.

15. The structure of claim 13, wherein the crash box includes:
a front crash box coupled to a front lower portion of the front skid member, provided thereon with a plurality of beads extending in a vertical direction thereof and spaced apart at regular intervals, and configured to deform in a horizontal direction thereof; and
a rear crash box coupled to a rear lower portion of the rear skid member, provided thereon with a plurality of beads extending in a horizontal direction thereof and spaced apart at regular intervals, and configured to deform in a vertical direction thereof.

16. The structure of claim 13, further including a rear center frame, wherein the first rear frame and the second rear frame extend in a height direction of the structure, the second rear frame is located at a rear of the first rear frame, and the rear center frame is disposed between the first rear frame and the second rear frame and extends in a longitudinal direction of the structure.

* * * * *